(12) United States Patent
Smorodinsky

(10) Patent No.: US 6,571,283 B1
(45) Date of Patent: *May 27, 2003

(54) METHOD FOR SERVER FARM CONFIGURATION OPTIMIZATION

(75) Inventor: Lev Smorodinsky, Laguna Hills, CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/474,706

(22) Filed: Dec. 29, 1999

(51) Int. Cl.⁷ .............................................. G06F 15/177
(52) U.S. Cl. ........................ 709/220; 709/221; 714/37
(58) Field of Search ................................ 709/220, 223, 709/224, 221; 714/100, 37, 38, 39, 4, 6, 25, 43, 44, 56; 710/17; 379/114.07; 705/7, 400, 405

(56) References Cited

U.S. PATENT DOCUMENTS 6,496,948 B1 * 12/2002 Smorodinsky ............... 714/37

* cited by examiner

Primary Examiner—David Wiley
Assistant Examiner—William C. Vaughn, Jr.
(74) Attorney, Agent, or Firm—Alfred W. Kozak; Mark T. Starr; Lise A. Rode

(57) ABSTRACT

A method and an estimator program for estimating the optimum Server Farm size and the availability of the Server Farm for a given Redundancy Factor and a given particular number of clients.

18 Claims, 4 Drawing Sheets

METHOD FOR SERVER FARM CONFIGURATION OPTIMIZATION

CROSS-REFERENCES TO RELATED APPLICATIONS

This application is related to U.S. Pat. No. 6,344,196 entitled "Estimator Program for Estimating the Availability of an Application Program That Runs in a Cluster of at Least Two Computers" and U.S. Ser. No. 09/443,926, Nov. 19, 1999, entitled "Method for Estimating the Availability of an Operating Server Farm" now Allowed, which applications are incorporated herein by reference.

FIELD OF THE INVENTION

This invention relates to data processing systems of the type which include a Server Farm that executes application programs for multiple clients (users); and more particularly, this invention relates to methods for optimizing the "Server Farm size" by balancing Server Farm performance and availability requirements in the above type of data processing systems.

BACKGROUND OF THE INVENTION

The referenced U.S. Pat. No. 6,334,195 entitled "Estimator Program for Estimating the Availability of an Application Program That Runs in a Cluster of at Least Two Computers" referenced above involves an estimator program to perform method steps for estimating the availability of an application program that rusn on any "server" in a cluster of at least two servers. By "availability of an application program" is meant the probability that at any particular tie instance, at least one of the servers in a cluster (farm) will actually be servicing requests from external workstations able to use the application program.

In one embodiment, the so-called estimator program begins by receiving input parameters which include (i) multiple downtime periods for each computer in the cluster (farm) that occur at respective frequencies due to various downtime sources, and (ii) an application "failover" time period for switching the running of the application program from any one computer to another computer which is operable. From these input parameters, the described estimator program estimates first and second annual stoppage times, then determines the availability of the application program on the cluster of computers which is derived from the sum of the first and second annual stoppage times.

Thus, as discussed, the estimator program of the previously-described invention estimated a first annual stoppage time for the application program due solely to the concurrent stoppage of all of the computers, as a function of the ratio of a single computer virtual downtime period over the single computer virtual time between stops. Then subsequently, the estimator program was used to estimate a second annual stoppage time for the application program, due solely to the switching for running the application program from one computer to another computer as a function of the single virtual stoppage rate and the application failover time period. From this, the estimator program determined the availability of the application program on the cluster of computers by deriving the sum of the first and second annual stoppage times.

The estimator program method was based on the assumption that "application availability" was to be determined from four factors which were:

(i) single-server hardware reliability;
(ii) maintenance, support, and service strategies;
(iii) user application and environment;
(iv) failover or system reconnection mechanism and application recovery mechanism.

The prior estimation parameters which were described in the co-pending application U.S. Ser. No. 08/550,603 did not take into consideration the total number of operating Server Farm clients and the normal single server workload of users involved with each single server. Further, this earlier application did not provide a recommendation or estimate regarding the number of servers required in the Server Farm (or cluster) which would meet the customers' performance and redundancy level requirements, nor did it establish an optimum farm configuration.

The method of the co-pending application U.S. Ser. No. 09/433,926, filed Nov. 19, 1999, now Allowed, entitled "Method for Estimating the Availability of an Operating Server Farm" extended the area of the original method application for Server Farms designed to serve user communities with a required particular number of customers "n". This method involving the Server Farm size and availability calculations is based on (1) the single server parameters such as (a) the meantime to failure (MTTF), (b) the meantime to repair (MTTR), and (c) the single server application performance benchmarks, and (2) individual customer preferential requirements, involving (a) the total number of Server Farm application users and (b) a desirable redundancy level.

This estimation method for availability uses the following definition of Server Farm availability. This definition is the probability that a Server Farm provides access to applications and data for a particular minimum number of users. As soon as the Server Farm can not serve this particular minimum number of users, it is considered failed. When some of the users have lost connections but can reconnect to other servers and continue to work and the majority of users do not experience any interruptions in their work, the farm is not considered failed, if it can still serve this particular number of users.

A widely used approach to improve a system's availability beyond the availability of a single system is by using Server Farms with redundant servers. In this case, if one of the farm's servers fails, the "unlucky" users connected to this server will lose their connections, but will have an opportunity to reconnect to other servers in the farm and get access to their applications and data. If all of the "unlucky" users get access to their applications and data, the farm is considered "available." If at least one of the "unlucky" users fails to get access to his/her applications and data, it means that the Server Farm's redundancy was exhausted and the Server Farm is considered failed.

The parameters for MTTF and MTTR can be estimated as indicated in the cited prior U.S. Pat. No. 6,334,196 as single computer virtual time between failures and a single computer virtual downtime period respectively, fro a particular application and user environment.

Therefore, the availability estimation method of the prior application U.S. Ser. No. 09/443,926 allows one to estimate such parameters of the Server Farm as number of servers, Server Farm availability, and Server Farm downtime, based on a set of input data. At the same time, however, this method does not provide any recommendations about optimum combinations of the Server Farm parameters that can be chosen at the Server Farm planning or design stage.

The presently described new method involving the Server Farm size optimization is based on the input data that include single server parameters similar to the prior application U.S. Ser. No. 09/443,926 and at least two new extra parameters: single server cost and the downtime cost. Additionally, this new method includes newly added steps of selecting an optimization parameter, selecting an optimization criterion, and using an optimization technique procedure to find the optimum value of the optimization parameter.

While the present invention may be shown in a preferential embodiment for a Server Farm that uses any workload balancing mechanism, it is not limited thereto, and can be used for any other data processing environment where the definition of the "Server Farm availability" can be applied.

Thus the object of the present invention is to provide a method for optimizing the "Server Farm size" by balancing Server, Farm performance and availability requirements. The method will generate an optimum recommendation for the selected set of input data, the selected optimization criterion and optimization parameter.

SUMMARY OF THE INVENTION

In accordance with the present invention, a novel estimator program performs method steps for the Server Farm optimization for a given particular number of clients "n" by balancing Server Farm performance and availability requirements. By the optimization of the Server Farm is herein meant the process of finding the optimum value of the selected optimization parameter that delivers the optimum value (maximum or minimum) for the selected optimization criterion and a given set of input data.

The method of optimization is based on a relationship between two major system attributes, performance and availability, that are "competing" for the same system redundant resources. The purpose of the Server Farm optimization is balancing of the business performance and availability requirements.

System performance in a Server Farm computing environment is a particular number of concurrent users with the minimum required application response time and reliable access to their applications and data. Server Farm availability is the probability that a Server Farm provides a required system performance level. A Server Farm parameter that indirectly defines the Server Farm availability and performance is a Redundancy Factor, that is a measure of the available system resources. It is a difference between maximum and nominal performance as a percentage of the maximum performance.

In one particular embodiment, the method uses a simplified Server Farm availability economic model. The model uses optimization criterion that is a total of the initial investment into "highly available" Server Farm and downtime losses during the period of owning a Server Farm. The Redundancy Factor is used as an optimization parameter. Different values of the Redundancy Factor can result in different Server Farm sizes. The greater values of the Redundancy, Factor mean that more system resources are used to increase Server Farm availability and usually more redundant servers are required to provide the same required Server Farm performance.

The method uses the fact that the decrease of the downtime losses do not always justify additional investments in redundant servers. First additions of the redundant servers usually deliver better Server Farm availability or less Server Farm downtime. At some particular Redundancy Factor value and/or Server Farm size, the Server Farm availability is close to the maximum possible value. In this case, the addition of the redundant servers will not decrease Server Farm downtime enough for the additionally expanded Server Farm cost justification. This Redundancy Factor value or the Server Farm size value is the optimum value that minimizes the total Server Farm owner losses that include the initial investment plus estimated downtime losses.

GLOSSARY LIST OF RELEVANT ITEMS

Figure 1:
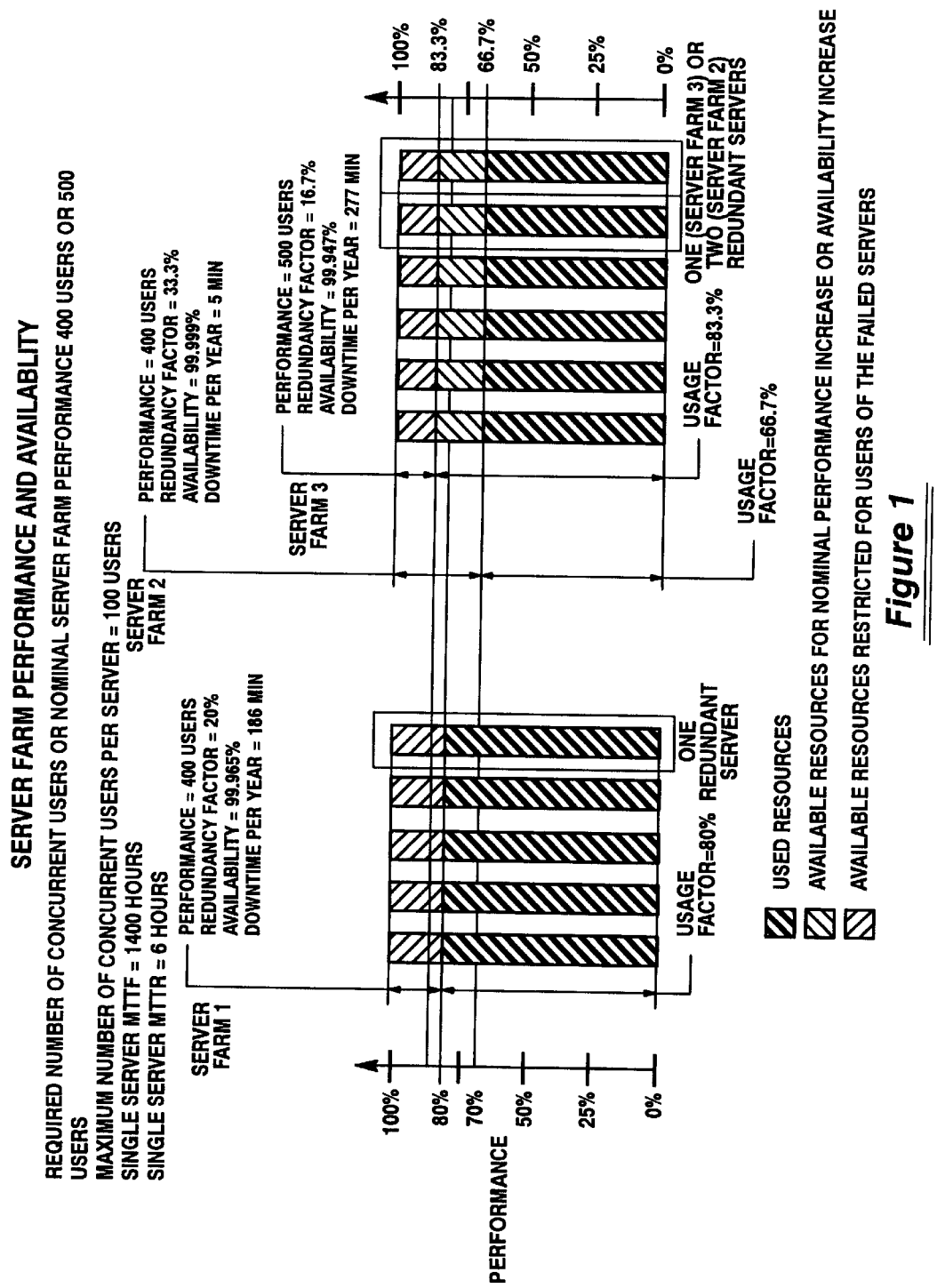
FIG. 1 is a drawing showing three different Server Farms with different performance and availability combinations.

1. AVAILABILITY: This is a measure of the readiness of the system and an application to deliver an expected service to the user with a required performance level. It may be described as a percentage of time that a system and an application are running as.distinguished from the system being down for maintenance or repairs.
2. MEAN TIME TO FAILURE (MTTF): This is the average operating time between two failures, that can be estimated as the total operating time divided by the number of failures.
3. MEAN TIME TO REPAIR (MTTR): This is the average "downtime" in case of failure, that can be estimated as the total downtime divided by the number of failures.
4. DOWNTIME: The downtime or repair time for a single application server is the time interval required to restore the server and system back to normal business operation. At the end of the repair period the applications running on the repaired server are available to users. The downtime for a Server Farm is the time interval required to restore the nominal Server Farm performance.
5. FAILOVER: This is a mode of operation in the system which has two or more servers or computers wherein a failure in one of the servers or computers will result in transfer of operations to the other or another one of the still operating servers and computers. Failover time is the period of time required for successful transfer from a failed server to an operative server.
6. ESTIMATOR PROGRAM: This is a program which performs method steps for estimating system parameters such as the availability of an application program to run on any computer or server in the cluster of at least two servers or computers. This type of estimator program was the subject of a co-pending application U.S. Ser. No. 550,603 which is incorporated herein by reference. Another estimator program is the subject of this patent application.
7. SERVER FARM: This designates a group of identical individual servers wherein each server can provide service to many single individual clients. The Server Farm can run enterprise class client/server applications (SAP, PeopleSoft, Microsoft SQL) or applications that are traditionally run on a single workstation (Microsoft Office 97). The Server Farm usually uses a work-load balancing mechanism that distributes requests for services or applications to the available servers.

8. REDUNDANCY FACTOR (Rf): This is a measure of the additional number of users that can be added to the nominal number of users per server without exceeding the maximum number of users per server (server performance benchmark maximum of users). It is a difference between maximum and nominal performance as a percentage of the maximum performance. The Redundancy Factor can be calculated as 100 percent minus a usage factor Uf.

9. SERVER FARM AVAILABILITY CALCULATOR: This is an estimator program which estimates the availability for the Server Farm.

10. THIN CLIENT SERVER FARM AVAILABILITY CALCULATOR: This is one of the examples of the SERVER FARM AVAILABILITY CALCULATOR. Because thin-client configurations are intended to make applications available to multiple users at the same time, this calculator calculates the availability of a specified number of instances of an application (not just a single instance) where each application instance is being run at the server, but all the user input response is taking place at the client terminal. In this scenario, downtime occurs whenever the number of available instances of the application drops below the required specified number of instances.

11. USAGE FACTOR (Uf): This is the ratio of the nominal number of users per server to the maximum number of users per server (server performance benchmark maximum of users) times 100 percent.

12. OPTIMIZATION CRITERION: This is a function that determines the value of one of the essential system attributes and must be minimized (or maximized) by variation of one or more system parameters that are chosen as OPTIMIZATION PARAMETERS. Each optimization parameter should have a predefined domain that defines the values that the optimization parameter may assume. The OPTIMIZATION CRITERION is a focus of an optimum system design or configuration. The examples of the optimization criteria are system performance, system availability, and cost of ownership.

DESCRIPTION OF PREFERRED EMBODIMENT

FIG. 1 shows analytical data graphs for 3 different Server Farms with different performance and availability combinations. All of the illustrated Server Farms comprise the same type usage of single servers with a maximum number of concurrent users per server at 100 users, a Mean Time To Failure=1,400 hours, and a Mean Time To Repair=6 hours. Server Farm 1 contains 5 servers and with Redundancy Factor=20% can support 400 concurrent users even in case of one server failure. Server Farm 2 and Server Farm 3 demonstrate two different possibilities if one additional server is added to the Server Farm 1.

Server Farm 2 uses all additional resources to improve Server Farm availability. All new available resources are restricted only for the users of the failed servers. Nominal Server Farm performance in Farm 2 is not changed (400 concurrent users) but the Redundancy Factor is increased from 20% to 33.3%. This results in the Server Farm availability increase from 99.965% to 99.999% and, respectively, in the Server Farm downtime decrease about 3 hours (181 min) per year. That is Server Farm 2 has 5 minutes/year downtime, while Farm 1 had 186 minutes/year downtime.

Server Farm 3 uses all additional resources to improve Server Farm performance. All new available resources are dedicated to new users. Nominal Server Farm performance is changed from the 400 concurrent users of Farms 1 and 2 to 500 users in Farm 3. Therefore, the Redundancy Factor is decreased from 20% (Farm 1) to 16.7%. (in Farm 3). This results in the slight Server Farm availability decrease from 99.965% (Farm 1) to 99.947% (Farm 3) and, respectively, in the Server Farm downtime increase about 1.5 hours (91 min) per year, i.e., 186 minutes downtime in Farm 1 and 277 minutes/year in Farm 3.

It can be noted that the Redundancy Factor is a key parameter in a Server Farm since it weighs heavily into Server Farm performance and Server Farm size. And as will be indicated later, the Redundancy Factor can be one of the optimization parameters for the optimum Server Farm configuration which minimizes the total investment and losses for the Server Farm that properly handles the required number of customers to be served.

In terms of Server Farm configuration cost, Table 1 demonstrates how the configuration differences affect the ownership cost of farm usage.

In Server Farm 1, assuming the cost of $400 per user per server, a downtime cost of $25,000 per hour per year, the calculation for ownership cost over 5 years is as follows:

5 SERVERS×$400 PER USER/SERVER×100 USERS/SERVER= $200,000 3.1 HOURS DOWNTIME×$25,000/HOUR . . . =$77,461/YEAR

TOTAL LOSSES+INVESTMENT FOR 5 YEARS FOR SERVER FARM 1 IS . . . $587,306

Now, regarding Server Farm 2:

6 SERVERS×$400 PER USER/SERVER×100 USERS/SERVER= $240,000 0.08 HOURS DOWNTIME×$25,000/HOUR=$1,981/ YEAR

TOTAL LOSSES+INVESTMENT FOR 5 YEARS FOR SERVER FARM 2 IS $249,905

TABLE 1

Server Farm Cost Analysis

|  | Server Farm 1 | Server Farm 2 | Server Farm 3 |
|---|---|---|---|
| Required number of concurrent users | 400 | 400 | 500 |
| Server MTTR, hours | 6 | 6 | 6 |
| Server MTTF, hours | 1,400 | 1,400 | 1,400 |
| Maximum number of concurrent users per server | 100 | 100 | 100 |
| Redundancy factor | 20.0% | 33.3% | 16.7% |
| Normal workload number of users | 80 | 66 | 83 |
| Estimated number of servers | 5 | 6 | 6 |
| Estimated peak number of users | 500 | 600 | 600 |
| Estimated number of redundant servers | 1 | 2 | 1 |
| Estimated Server Farm availability (%) | 99.96463% | 99.99910% | 99.94738% |
| Estimated Server Farm downtime, hour/year | 3.10 | 0.08 | 4.61 |
| Cost per user per server, $/user per server | $400 | $400 | $400 |
| Farm cost, $ | $200,000 | $240,000 | $240,000 |

TABLE 1-continued

Server Farm Cost Analysis

|  | Server Farm 1 | Server Farm 2 | Server Farm 3 |
| --- | --- | --- | --- |
| Downtime cost per hour, $/hour | $25,000 | $25,000 | $25,000 |
| Downtime cost per year, $/year | $77,461 | $1,981 | $115,241 |
| System life period, years | 5 | 5 | 5 |
| Downtime cost for system life period | $387,306 | $9,905 | $576,203 |
| Total losses + investment | $587,306 | $249,905 | $816,203 |

For Server Farm 3 of FIG. 1 which must handle 500 users, the five-year ownership cost with 6 servers is as follows:

6 SERVERS×$400 PER USER/SERVER×100 USERS/SERVER
   $240,000 4.61 HOURS DOWNTIME×$25,000/HOUR=$115,241/YEAR

TOTAL LOSSES+INVESTMENT FOR 5 YEARS FOR SERVER FARM 2 IS $816,203

Thus, based on the criterion "TOTAL LOSSES+INVESTMENT FOR 5 YEARS", Server Farm 2 justifies an investment into the additional server, which was added to the Server Farm 1.

Figure 2:
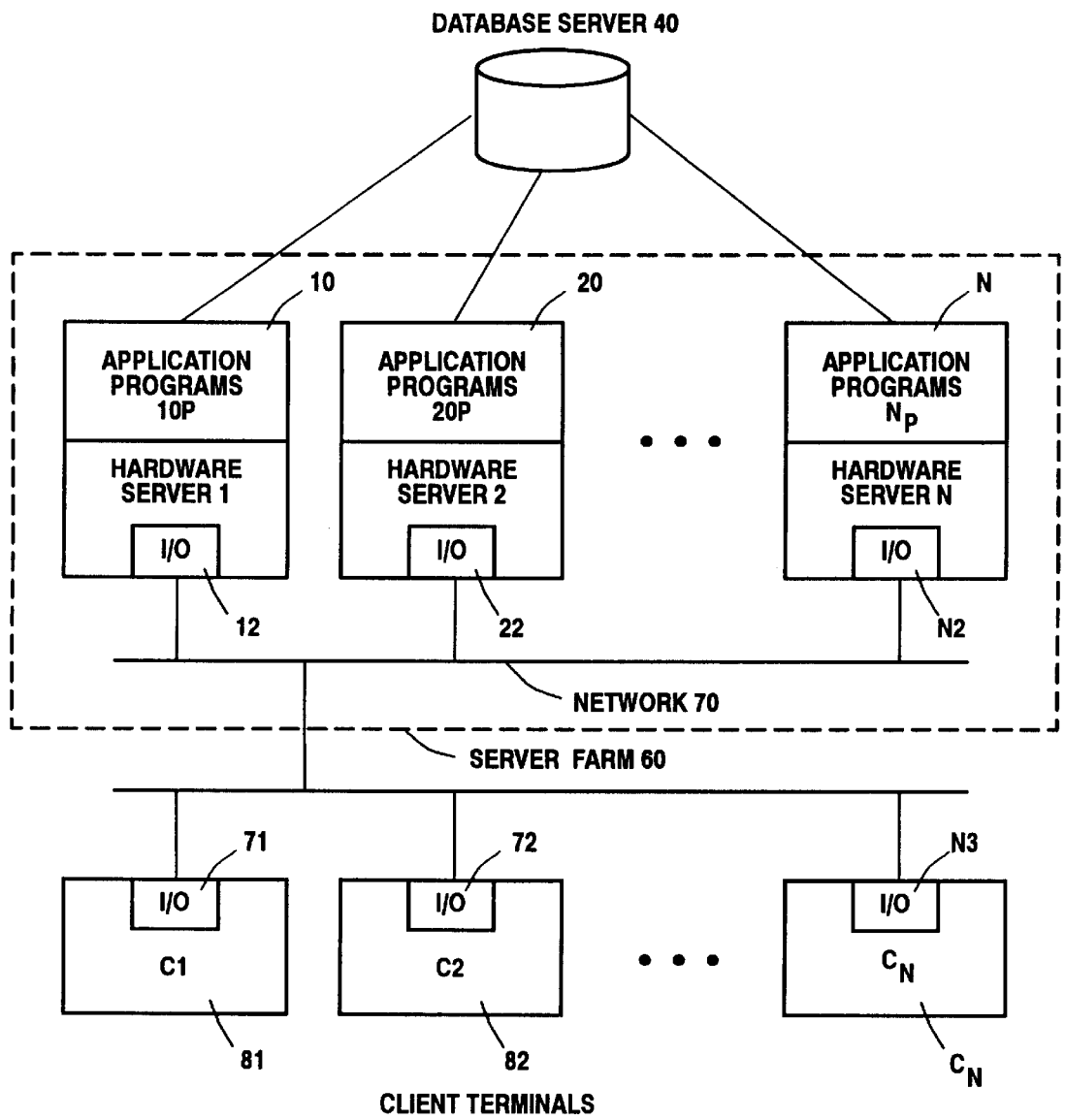
FIG. 2 is a drawing of a data processing system which includes an application Server Farm that executes application programs for multiple clients (users). This is an example of the typical system where the optimization method of balancing Server Farm performance and availability requirements can be applied.

FIG. 2 is a generalized diagram that shows a type of environment, such as Server Farms 1, 2, and 3 in FIG. 1, to which the present invention relates. Shown in FIG. 2 is an application Server Farm 60, a database server 40, and a set of client terminals 81, 82, . . . , $C_N$, having respective I/O modules 71, 72, . . . , N3. The database server 40 is connected to a group of farm servers designated as 10, 20, . . . , N. Each of the servers is able to run application programs designated as 10p, 20p, . . . , Np. Network 70 is coupled to Input/Output (I/O) units 12, 22, . . . , N2, on the farm servers 10, 20, . . . , N and to I/O units 71, 72, . . . , N3 on client terminals 81, 82, . . . , $C_N$. Users (clients) can use client terminals 81, 82, . . . , $C_N$ to access the application programs in the farm servers via the network 70.

Figure 3:
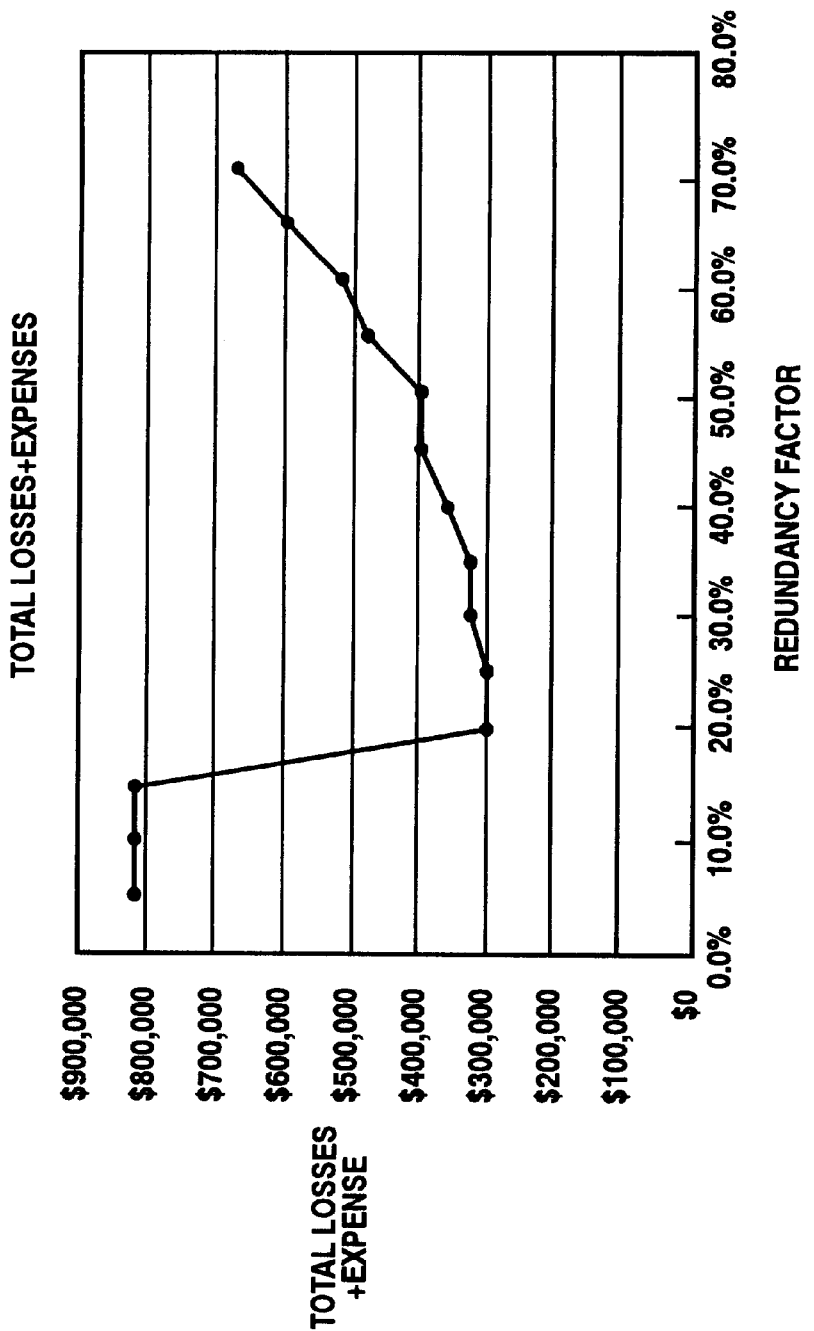
FIG. 3 shows an example of the optimization criterion as a function of the optimization parameter. Here, the optimization criterion is a total of the initial investment into highly available Server Farm and downtime losses during the period of owning a Server Farm.

FIG. 3 illustrates an example of the optimization criterion "TOTAL LOSSES+INVESTMENT FOR 5 YEAS", T, with optimization parameter "Redundancy Factor". This criterion is a function of Single Server Farm cost, downtime cost, and Redundancy Factor. Single server farm cost, C, is calculated as a product of the cost per user per server and the maximum number of concurrent users per server. Downtime cost for five years, D, is calculated as a product of downtime cost per hour, downtime per year (in hours), and five years. The number of servers in the farm, N, is calculated using the method described in the co-pending patent application U.S. Ser. No. 09/443,926 based on single-server parameters, customer performance requirements, and the given value of the Redundancy Factor. In this example, the optimization criterion "TOTAL LOSSES+INVESTMENT FOR 5 YEARS" is:

$T=C*N+D$

The value of the optimization criterion for Redundancy Factor equal to 0 (no redundant servers) is greater than $23,000,000 and is not shown in FIG. 3. At the Redundancy+Factor values 5–15% (one redundant server) the optimization criterion is significantly less, equaling about $816,000. The investment in another redundant server (Redundancy Factor 20–25%) is nevertheless justified as downtime losses are significantly reduced. After that point, an increase in the Redundancy Factor results in a negligible reduction of downtime that does not justify investment in additional redundant servers. Therefore, the Redundancy Factor values 20–25% that correspond to two redundant servers are the optimum values of the Redundancy Factor that minimize the value of the optimization criterion "TOTAL LOSSES+INVESTMENT FOR 5 YEARS".

Now, in accordance with the present invention, steps are provided for optimization of an operating Server Farm designed to serve a particular number of clients "n". These steps will be described in conjunction with FIG. 4 that shows an estimator program, which performs method steps for estimating the optimum value of one of the possible optimization parameters of an operating Server Farm.

Figure 4:
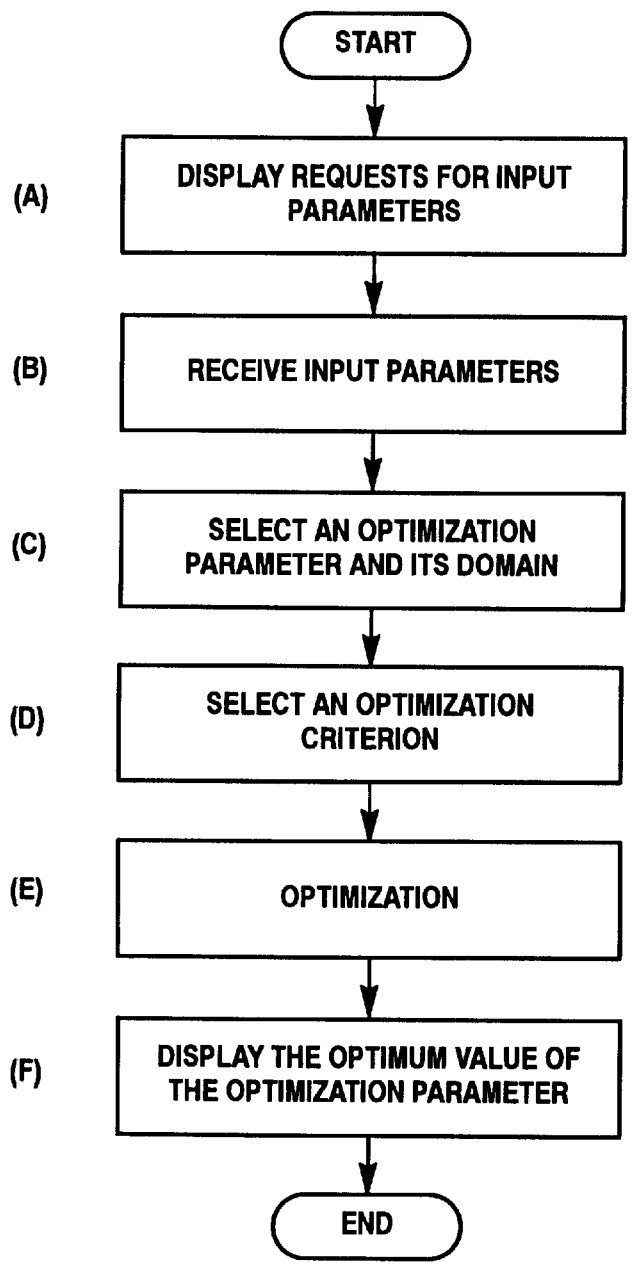
FIG. 4 shows an estimator program, which performs method steps for estimating the optimum value of one of the possible optimization parameters of an operating Server Farm designed to serve a particular number of clients "n".

In step A of FIG. 4, requests for the following input parameters are displayed: (1) required number of clients "n" for utilizing said Server Farm, (2) the single server farm cost, (3) the downtime cost per hour, (4) the maximum single-server workload of users, (5) the Mean Time To Repair for a single server, and (6) Mean Time To Failure for a single server.

In step B of FIG. 4, the values of the requested input parameters are entered on the computer monitor by means of keyboard.

In step C of FIG. 4, an optimization parameter and its domain is selected. For example, in FIG. 3, the selected optimization parameter is the Redundancy Factor. The Redundancy Factor domain is an interval between 0 and 100 percent. Other possible optimization parameters are a Server Farm size that is any natural integer number of servers and a normal single-server workload of users which is any number between one and the maximum single server workload.

In step D of FIG. 4, an optimization criterion is selected. In FIG. 3, for example, the selected optimization criterion is "TOTAL LOSSES+INVESTMENT FOR 5 YEARS":

$T=C*N+D$.

As mentioned above, the number of servers in the farm, N, is calculated using the method described in the co-pending patent application U.S. Ser. No. 09/443,926 based on single-server parameters, customer performance requirements, and the given value of the Redundancy Factor.

In step E of FIG. 4, optimization of the optimization criterion selected at step D occurs by one of the known optimization techniques described in the books: *Practical Optimization* by Philip Gill, Academic Press, 1981 and/or *Engineering Optimization: Methods and Applications* by G. V. Reklaitis and others, John Wiley & Sons, 1983. FIG. 3 illustrates one of the simplest optimization techniques by the plotting of the graph for a set of values of the optimization parameter. Particularly, the used values of the Redundancy Factor are from 0 to 100 percent with a step of 5%: 0, 5, 10, . . . , 100%. If the accuracy of the calculation is not sufficient, then the value of step can be reduced from 5% to 2.5%, etc.

In step F of FIG. 4, the optimum value(s) of the optimization parameter is displayed. For example, in FIG. 3, the optimum values of the redundancy factor 20 and 25 percent that corresponds to two redundant servers. The optimum value of the optimization parameter for the Redundancy Factor 20 or 25 percent is about $297,000.

Described herein has been an optimization method and an estimator program for a Server Farm designed to serve a particular number of clients.

While a preferred implementation of the invention has been described, it should be understood that other implementations may be used which are still encompassed by the attached claims.

What is claimed is:

1. An estimator program that performs method steps for estimating the optimum operating Server Farm designed to serve a particular number of clients "n" comprising the steps of:
   (a) inputting a group of parameters involving at least one parameter involving at least one parameter for Single Server Farm cost evaluation and at least one parameter for downtime cost evaluation; wherein said step (a) of inputting said group of parameters includes the steps of:
      (a1) selecting for input said particular number of clients "n" for utilizing said Server Farm;
      (a2) selecting for input one parameter for said single Server Farm cost evaluation;
      (a3) selecting for input one parameter for said downtime cost evaluation;
   (b) selecting at least one Server Farm optimization parameter and its domain which indicates the values that the Server Farm optimization parameter may assume;
   (c) selecting a Server Farm optimization criterion that is a function of at least three arguments: (i) said Single Server Farm cost evaluation; (ii) said downtime cost evaluation; (iii) said Server Farm optimization parameter;
   (d) using an optimization technique to find the optimum value of the optimization parameter.

2. The method of claim 1 wherein step (a2) involves the Single Server Farm (SSF) cost.

3. The method of claim 1 wherein step (a3) involves the client-license cost per client per server.

4. The method of claim 1 wherein step (a3) involves the downtime cost per client, per hour.

5. The method of claim 1 wherein step (a3) involves the downtime cost per server.

6. The method of claim 1 wherein step (a) further includes the steps of:
   (2a4) selecting for input a maximum single server workload of users;
   (2a5) selecting for input a Mean Time To Repair (MTTF) for a single server;
   (2a6) selecting for input a Mean Time To Failure (MTTF) for a single server.

7. The method of claim 1 wherein step (b) for selecting an optimization parameter includes:
   (b1) selecting a Redundancy Factor having a domain which is an interval between 0 and 100 percent.

8. The method of claim 1 wherein step (b) for selecting an optimization parameter includes:
   (b2) selecting a Server Farm size which is any natural integer number of servers.

9. The method of claim 1 wherein step (b) for selecting an optimization parameter includes:
   (b3) selecting a normal single server workload of users having a domain which is any number between one (1) and the maximum single server workload.

10. The method of claim 1 wherein step (c) for selecting said optimization criteria of three arguments includes:
    (c1) selecting an optimization function which is the sum of the entire Server Farm cost and the downtime losses calculated as based on said Single Server Farm (SSF) cost evaluation and said downtime cost evaluation.

11. The method of claim 1 wherein step (c) for selecting said optimization criteria includes:
    (c2) selecting an optimization function which is a linear or concave function (up everywhere on the function's domain or down everywhere on the function's domain) of said Server Farm cost evaluation and said downtime losses evaluation.

12. The method of claim 1 wherein step (d) for using said optimization procedure includes the steps of:
    (d1) selecting a value of said optimization parameter from said domain;
    (d2) calculating said Single Server Farm cost;
    (d3) calculating said downtime cost;
    (d4) calculating a value of said optimization criterion;
    (d5) making an evaluation decision about the end or the continuation of said optimization procedure.

13. The method of claim 12 wherein step (d2) involves the single server cost.

14. The method of claim 12 wherein step (d2) involves the client-license cost per client, per server.

15. The method of claim 12 wherein step (d3) involves the downtime cost per server, per hour.

16. The method of claim 12 wherein step (d3) involves the downtime cost per client, per hour.

17. The method of claim 12 wherein step (d5) involves the decision to stop the procedure if the optimum number of servers in the configured farm is determined.

18. The method of claim 12 wherein step (d5) includes the step of:
    (d5a) continuing the optimization procedure if the optimum number for Server Farm size is not yet determined, by repeating said steps (d2) through (d5) with another value of said optimization parameter from said domain.

* * * * *